United States Patent [19]

Uemura et al.

[11] Patent Number: 5,704,884
[45] Date of Patent: Jan. 6, 1998

[54] MACHINE TOOL WITH SLIDE COVER APPARATUS

[75] Inventors: Satoru Uemura, Kariya; Yukio Hoshino, Gamagori; Koichi Sakai, Kasugai, all of Japan

[73] Assignee: Toyoda Koki Kabushiki Kaisha, Kariya, Japan

[21] Appl. No.: 401,266

[22] Filed: Mar. 9, 1995

[30] Foreign Application Priority Data

Mar. 9, 1994 [JP] Japan .................... 6-064346

[51] Int. Cl.⁶ .................................... B23Q 3/157
[52] U.S. Cl. .................... 483/3; 74/608; 160/116; 408/710; 409/134; 451/451
[58] Field of Search ............ 483/3, 30, 2; 409/134; 408/710, 241.6; 451/451, 455, 457, 454; 160/202, 185, 116, 117; 74/608, 609

[56] References Cited

U.S. PATENT DOCUMENTS

| 4,999,895 | 3/1991 | Hirose et al. ................ 29/33 P |
| 5,178,499 | 1/1993 | Umeda et al. ................ 409/134 |
| 5,181,898 | 1/1993 | Piotrowski ................... 483/3 |
| 5,265,497 | 11/1993 | Curless ..................... 409/134 X |
| 5,342,275 | 8/1994 | Yanese et al. ............... 483/1 |
| 5,439,431 | 8/1995 | Hessbrüggen et al. ........ 483/56 X |
| 5,482,414 | 1/1996 | Hayashi et al. ............. 74/608 X |

FOREIGN PATENT DOCUMENTS

| 7246 | 1/1988 | Japan ........................ 483/3 |
| 63-295107 | 12/1988 | Japan ........................ 409/134 |
| 321140 | 12/1989 | Japan ........................ 409/134 |
| 2-15946 | 1/1990 | Japan ........................ 409/134 |

*Primary Examiner*—William Briggs
*Attorney, Agent, or Firm*—Oblon, Spivak, McClelland, Maier & Neustadt, P.C.

[57] ABSTRACT

In a machine tool of the present invention, a spindle head rotatably supports a vertical tool spindle. On the spindle head base, a guide mechanism is provided so as to guide the spindle head in mutually orthogonal first and second horizontal directions and in a vertical direction. A workpiece is supported on a workpiece supporting base provided at a front side of the spindle head base. The workpiece is surrounded with a side cover assembly on the workpiece support base so as to define a machining area therewithin. The upper end of the side cover assembly is covered with a top cover assembly. The top cover assembly has a spindle hole through which a nose portion of the spindle head passes so as to permit the tool spindle to reach the machining area, and is flexibly operable to follow the movements of the spindle head in the first and second horizontal directions.

11 Claims, 15 Drawing Sheets

5,704,884

MACHINE TOOL WITH SLIDE COVER APPARATUS

BACKGROUND OF THE INVENTION

1. Field of the Invention

The present invention relates to a machine tool for machining a workpiece, and more particularly, to an automatic machine tool which is kept clean, less frequent in malfunction and low in manufacturing cost. It further relates to an automatic machine tool suitable for arrangement on a transfer line.

2. Discussion of the Prior Art

In conventional machine tools and particularly, in those for cutting operation, it is often that cutting chips and coolant scatter during machining operation to contaminate the machine tool and other devices therefor.

The machine tool is provided with a plurality of slide surfaces along which a spindle head with a cutting tool is moved in vertical and horizontal directions, to be accurately positioned to a machining position. During the machining operation, parts of the scattering cutting chips, coolant and so on adhere to the slide surfaces. This causes deterioration in machining accuracy and malfunction of the machine tool. Particularly, in a transfer line system including a plurality of automatic machine tools, the malfunction of one automatic machine tool adversely affects the whole of the transfer-line system.

To overcome the aforementioned problem, each of the slide surfaces is provided with a slide cover. An assembly of plural telescopic members of steel or flexible bellow is used as the slide cover. However, the manufacturing cost of the slide cover is relatively high. Further, drawbacks are involved in that the slide covers restrict the areas for attachment of other devices such as an automatic tool changer and also harm working accessibility for workers.

SUMMARY OF THE INVENTION

Accordingly, it is a primary object of the present invention to provide an improved machine tool wherein slide surfaces for a spindle head can be protected at a low cost from contamination by coolant, cutting chips and so on.

Another object of the present invention is to provide an improved machine tool wherein its components such as an automatic tool changer and the like can also be free from contamination by coolant, cutting chips and so on.

Still another object of the present invention is to provide an improved machine tool suitable for arrangement on an automated machining line.

Briefly, a machine tool comprises a spindle head base, a spindle head rotatably supporting a vertical tool spindle, a guide mechanism provided on the spindle head base and guiding the spindle head in mutually orthogonal first and second horizontal directions and in a vertical direction, a workpiece support base provided at a front side of the spindle head base for supporting a workpiece, a side cover assembly surrounding the workpiece on the workpiece support base so as to define a machining area therewithin, and a top cover assembly cooperating with the side cover assembly to cover the upper end of the side cover assembly and having a spindle hole through which a nose portion of the spindle head passes so as to permit the tool spindle to reach the machining area. The top cover assembly is flexibly operable to follow the movements of the spindle head in the first and second horizontal directions.

With this configuration, the machining area is surrounded by the side cover assembly. The top area of the side cover assembly is covered by the top cover assembly. Therefore, the machining area is completely separated from the outside, whereby it is not required that each slide surface for the guide mechanism is covered with an expensive slide cover.

In another aspect of the present invention, the top cover assembly is provided at a lower position than the guide mechanism. As a result, cutting chips, coolant and so on are more completely prevented from adhering to the slide surfaces for the guide mechanism.

In still another aspect of the present invention, the slide cover assembly comprises a rear side cover member provided adjacent to the spindle head base, a front side cover member, and a pair of lateral side cover members. At least one of the lateral side cover members has a shutter for closing a window thereof. On loading the workpiece into the machining area the workpiece from the machining area, the shutter can be opened.

In a further aspect of the present invention, a tool magazine and an automatic tool changer are provided under the guide mechanism. A window formed at the rear side cover member is selectively opened and closed by a third shutter. The automatic tool changer is operable to present at least a part thereof into the machining area for changing tools between the tool spindle and the tool magazine. Therefore, the tool magazine and the automatic tool changer can also be protected from contamination by coolant, cutting chips and so on.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which.

Figure 7:
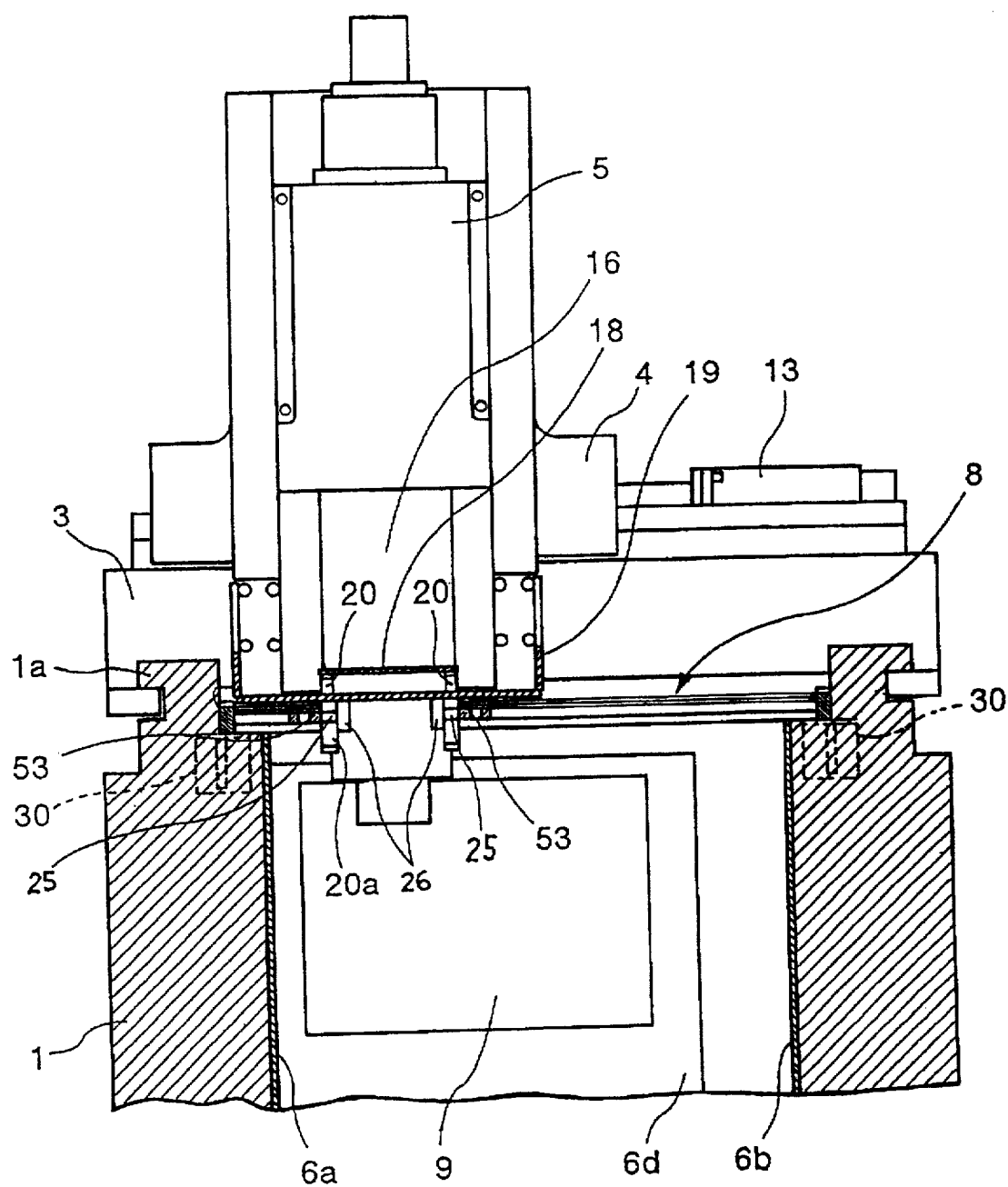
FIG. 7 is a sectional view taken along the line VII—VII in FIG. 5.
Figure 9A:
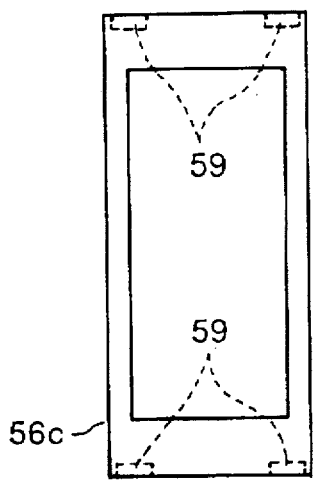
Figure 9C:
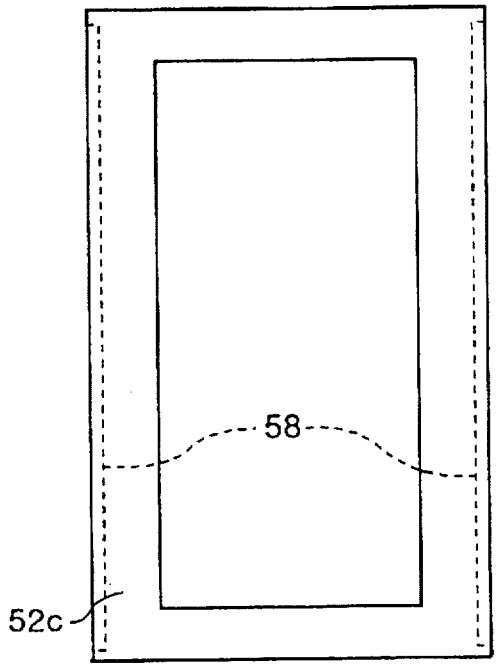
Figure 9B:
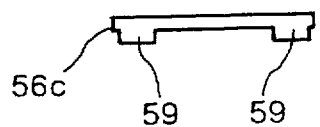
Figure 9D:
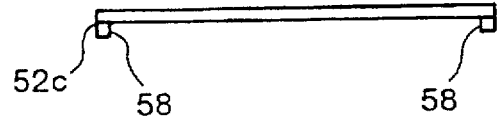
Figure 9E:
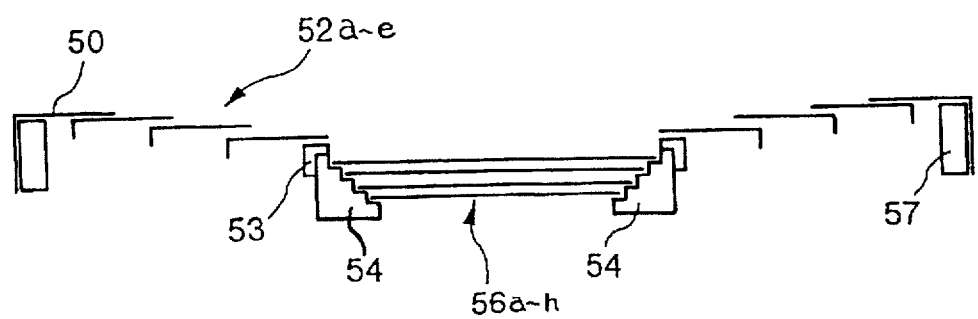
Figure 10:
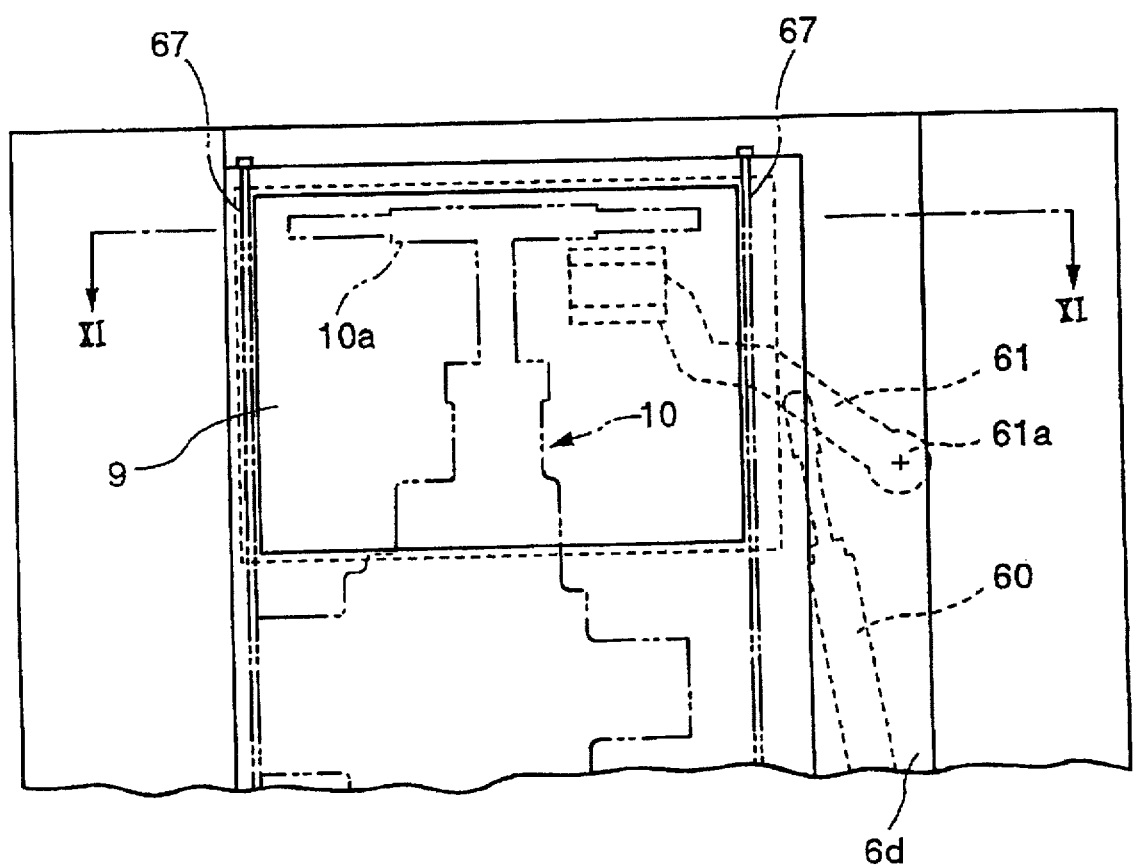
Figure 11:
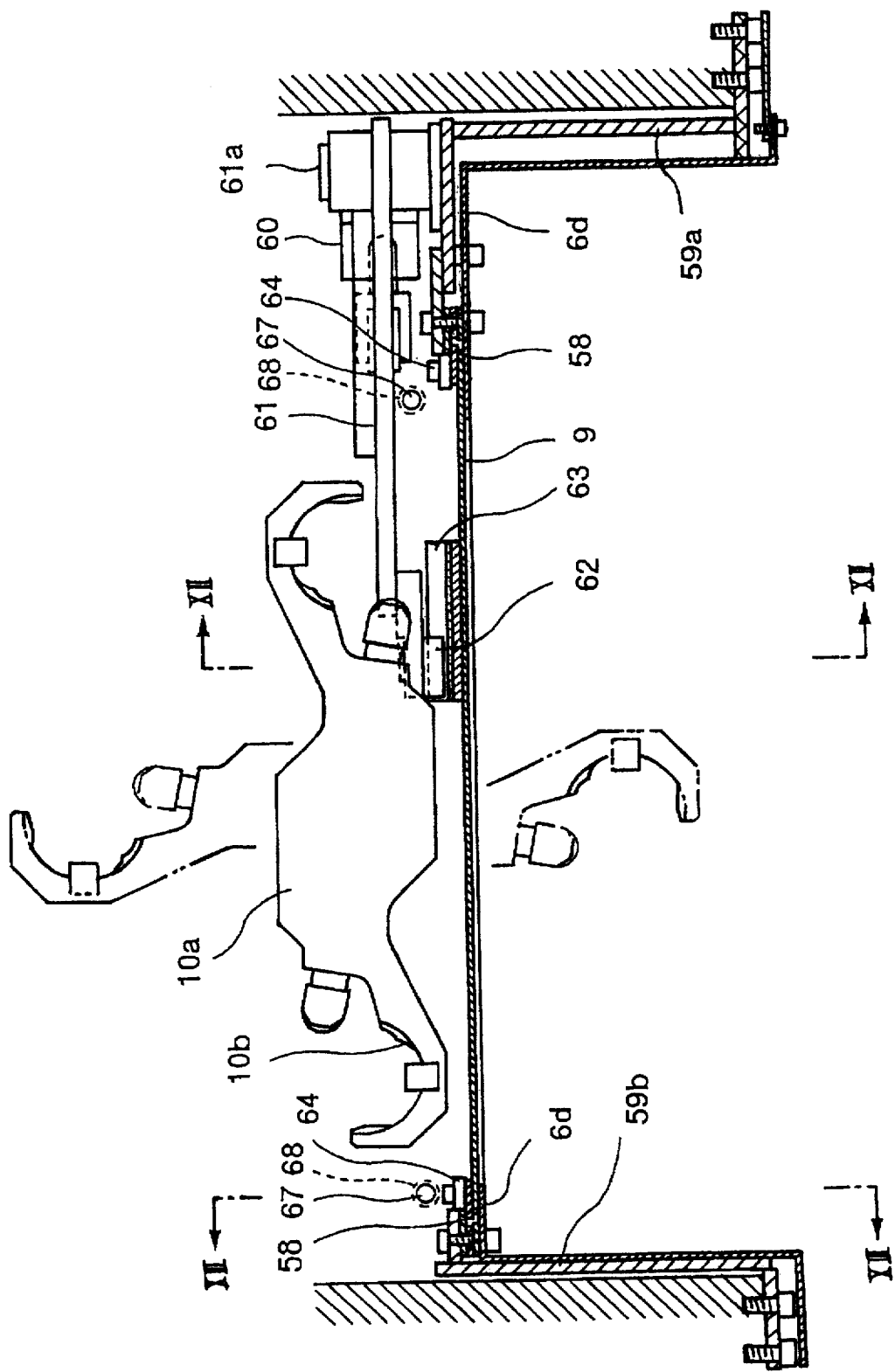
Figure 12:
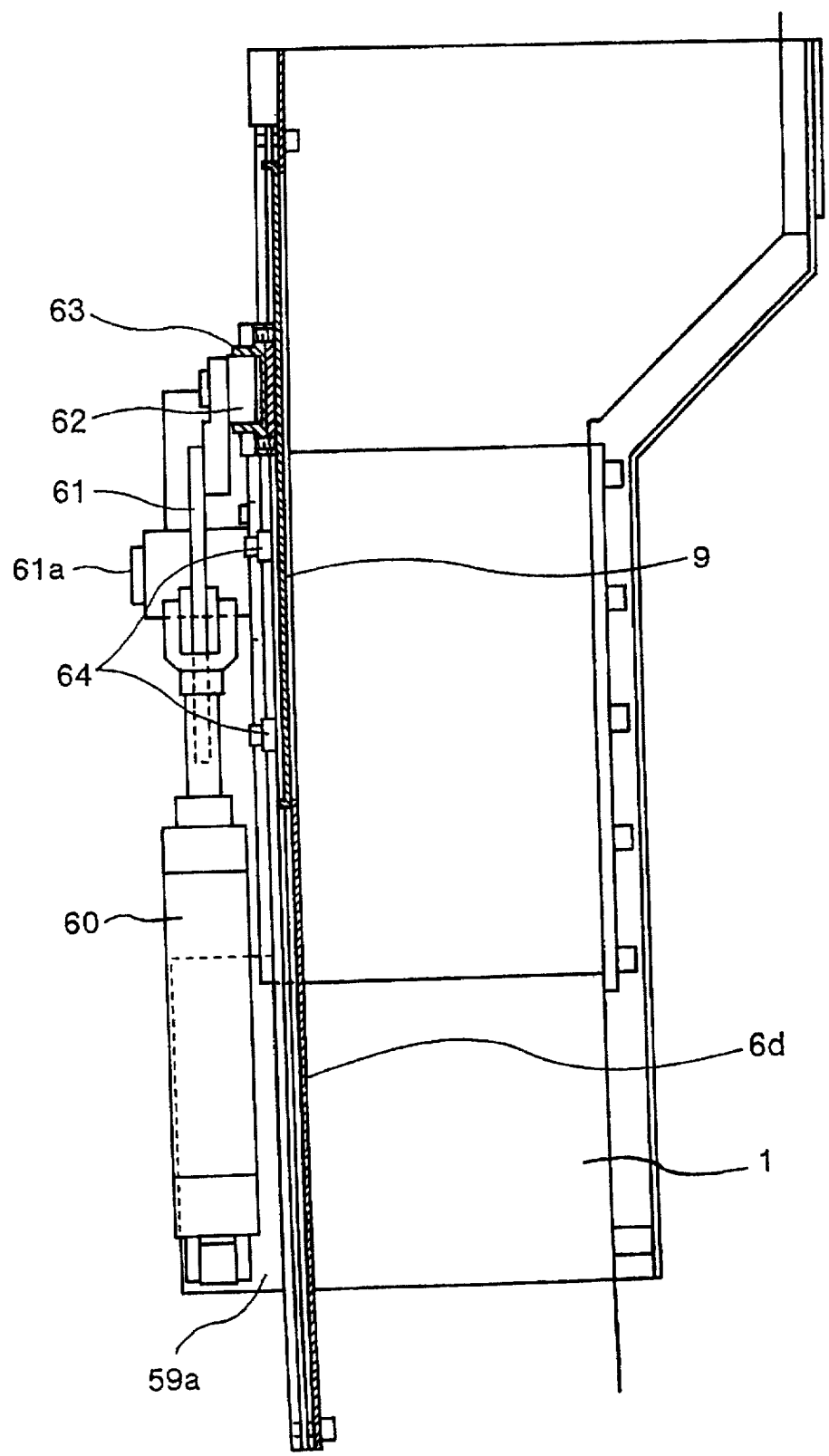
Figure 13:
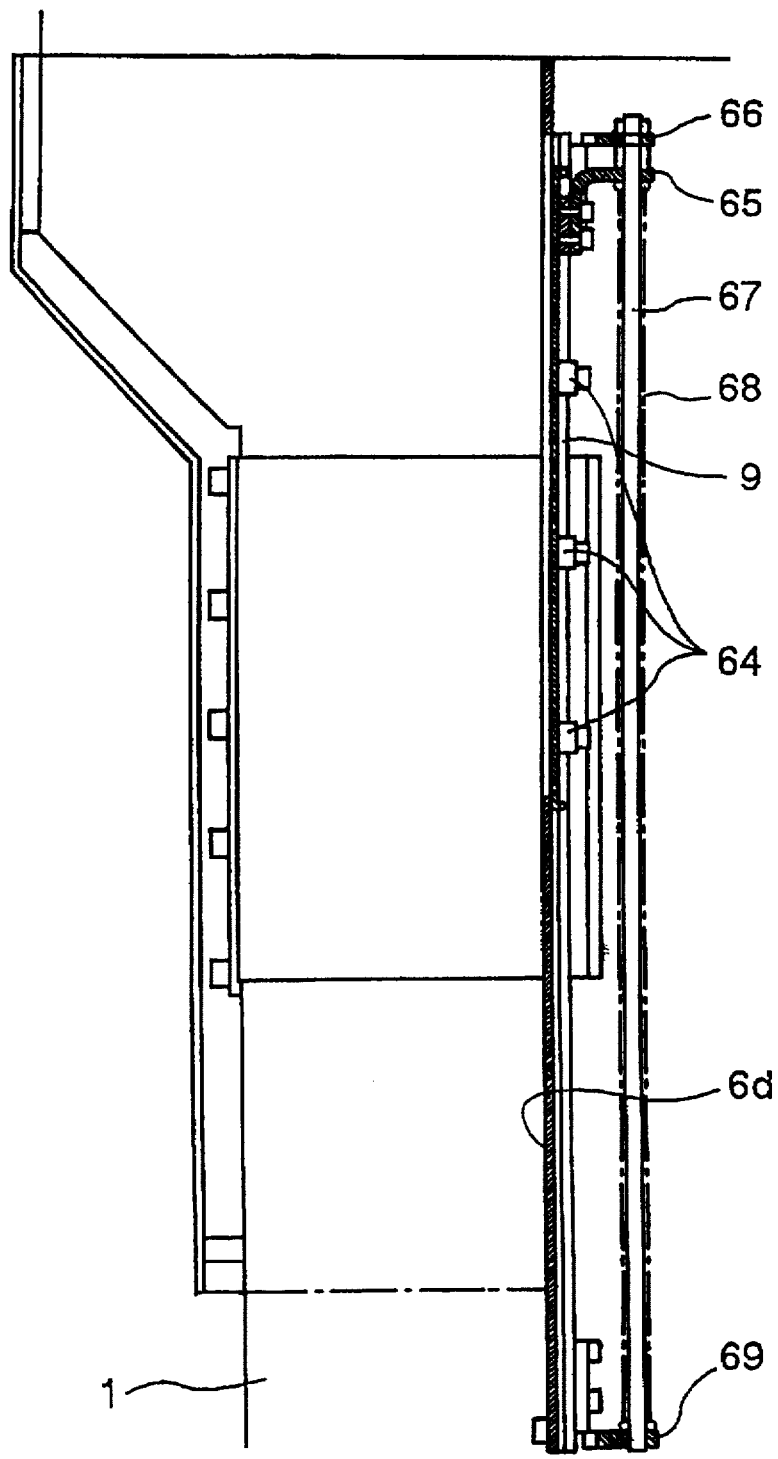
Figure 14:
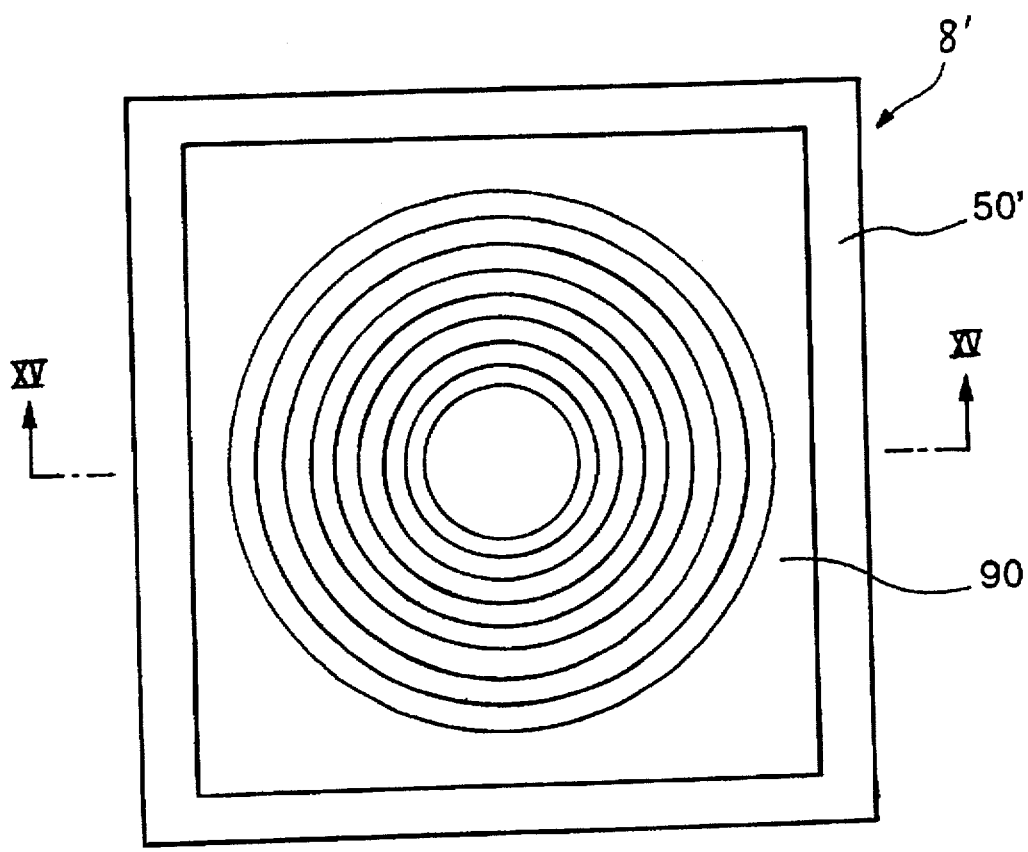
Figure 15:
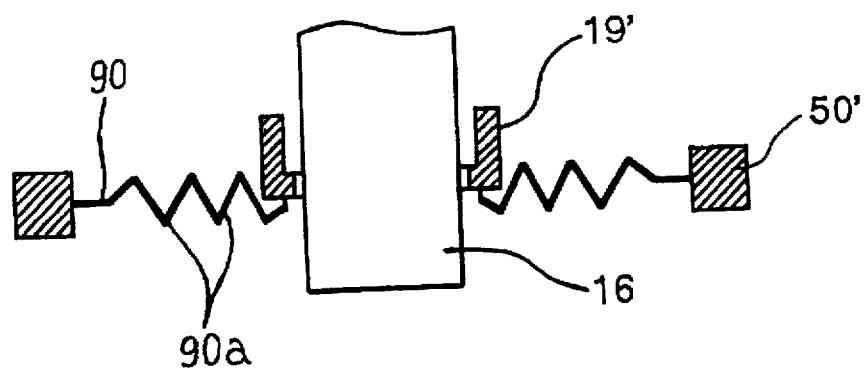

FIGS. 9(a) and (b) are respectively top plan and front views of one of second cover members movable back and forth in a horizontal plane;

FIGS. 9(c) and (d) are respectively top plan and front views of one of first cover members movable right and left in a horizontal plane;

FIG. 9(e) is a schematic illustration for showing the entire arrangement of the first and second cover members constructing the top cover assembly;

FIG. 10 is a fragmentary front view of a tool changer shutter shown in FIG. 7;

FIG. 11 is a sectional view taken along the line XI—XI in FIG. 10 to show the tool changer shutter and vicinity thereof;

FIG. 12 is a sectional view taken along the line XII—XII in FIG. 11 to show a cylinder-lever mechanism for the tool changer shutter;

FIG. 13 is a sectional view taken along the line XIII—XIII in FIG. 11;

FIG. 14 is a top plan view of a top cover assembly used in the second embodiment;

FIG. 15 is a sectional view taken along the line XV—XV in FIG. 14; and

Figure 4:
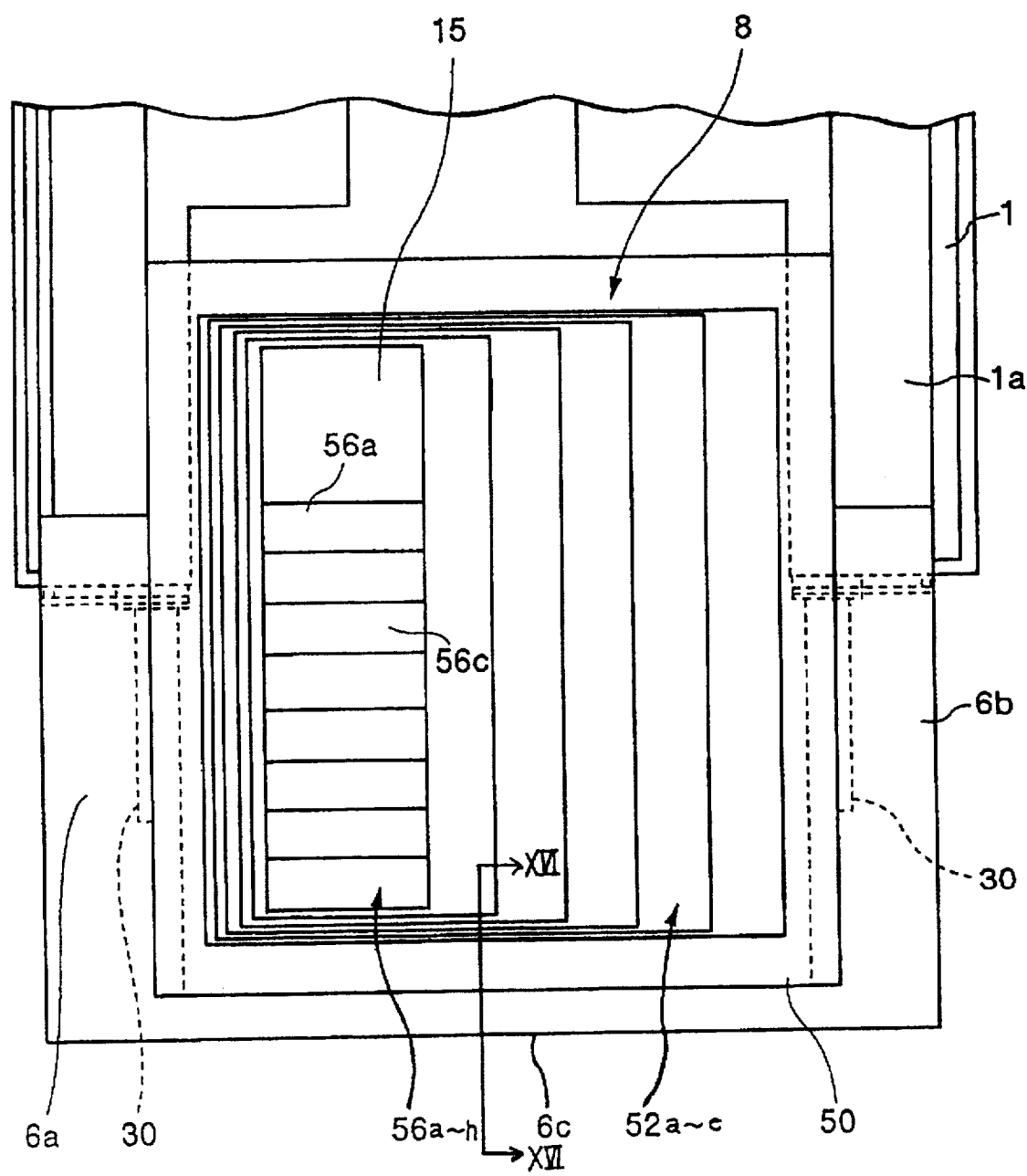
FIG. 4 is a fragmentary top plan view showing a top cover assembly and vicinity thereof of the machine tool except for the spindle head.
Figure 16:
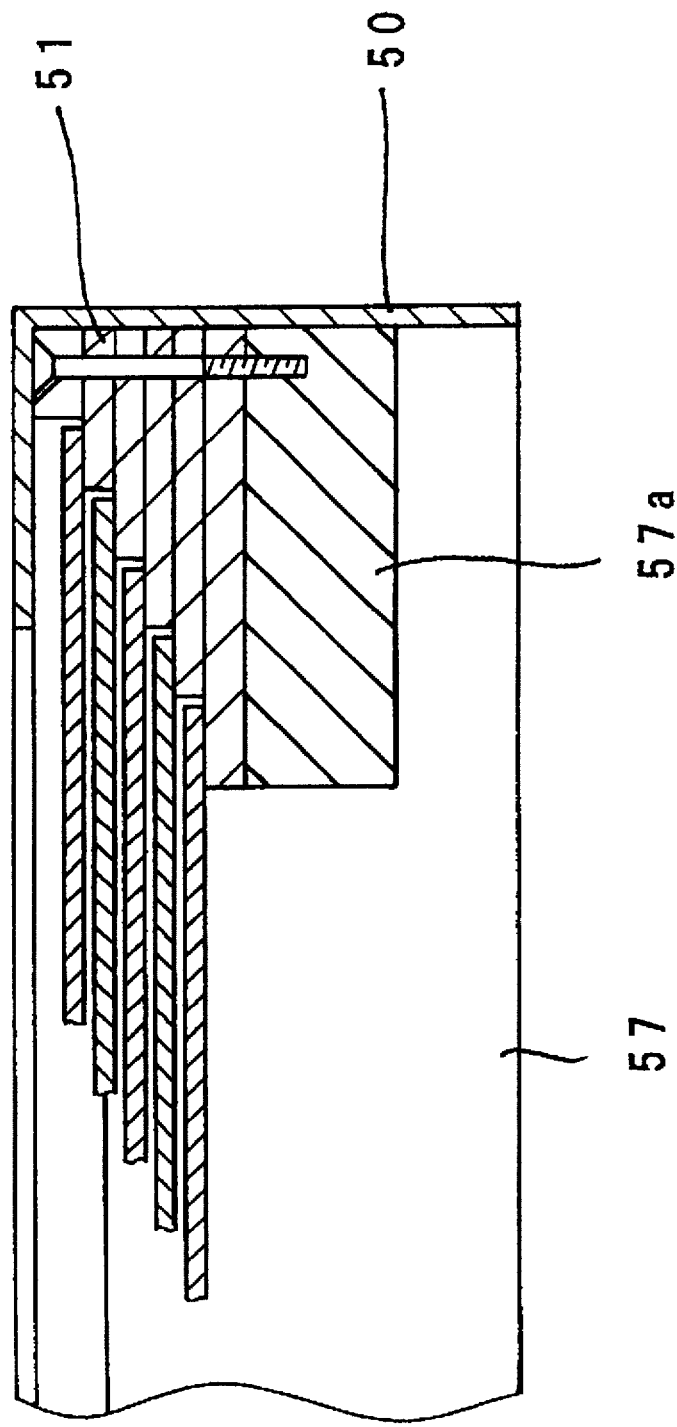

FIG. 16 is a sectional view taken along the line XVI—XVI in FIG. 4.

DETAILED DESCRIPTION OF THE PREFERRED EMBODIMENTS

Figure 1:
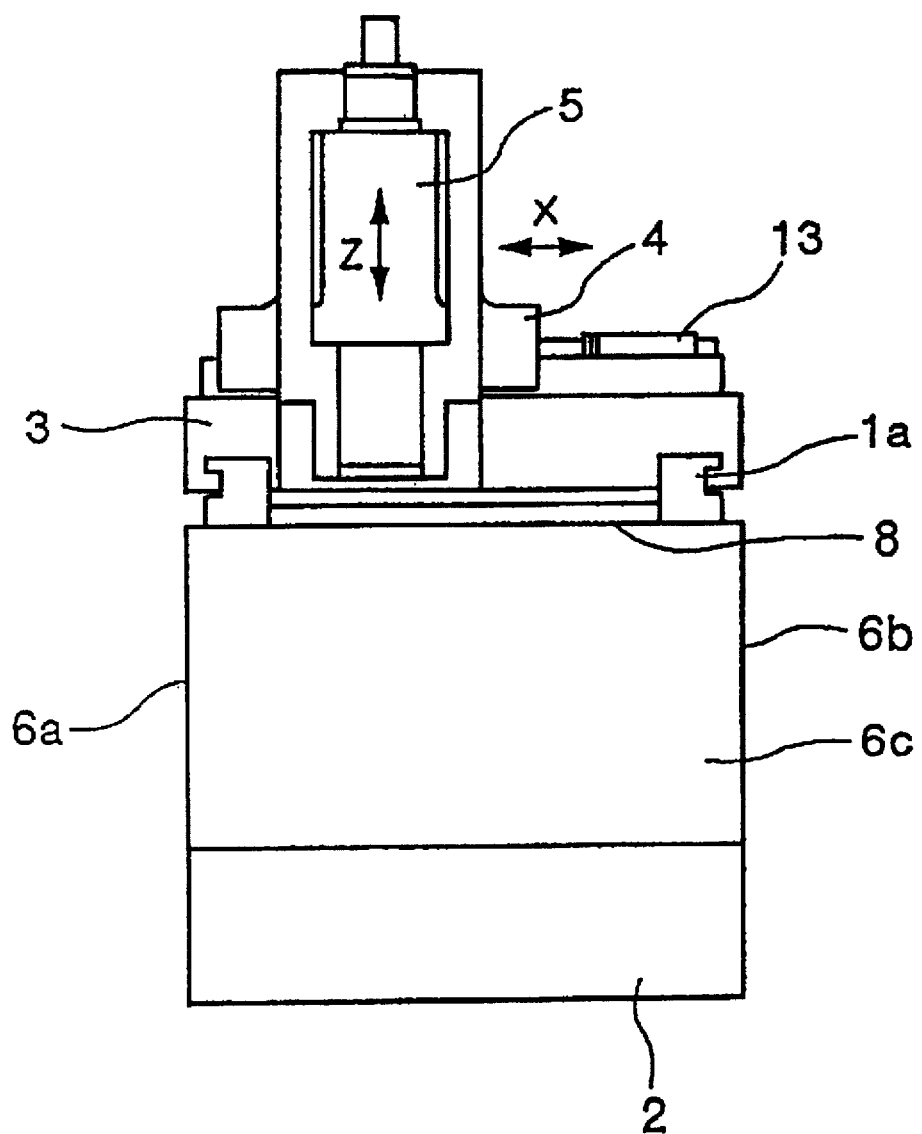
FIG. 1 is a front view of a machine tool according to the first embodiment of the present invention.
Figure 2:
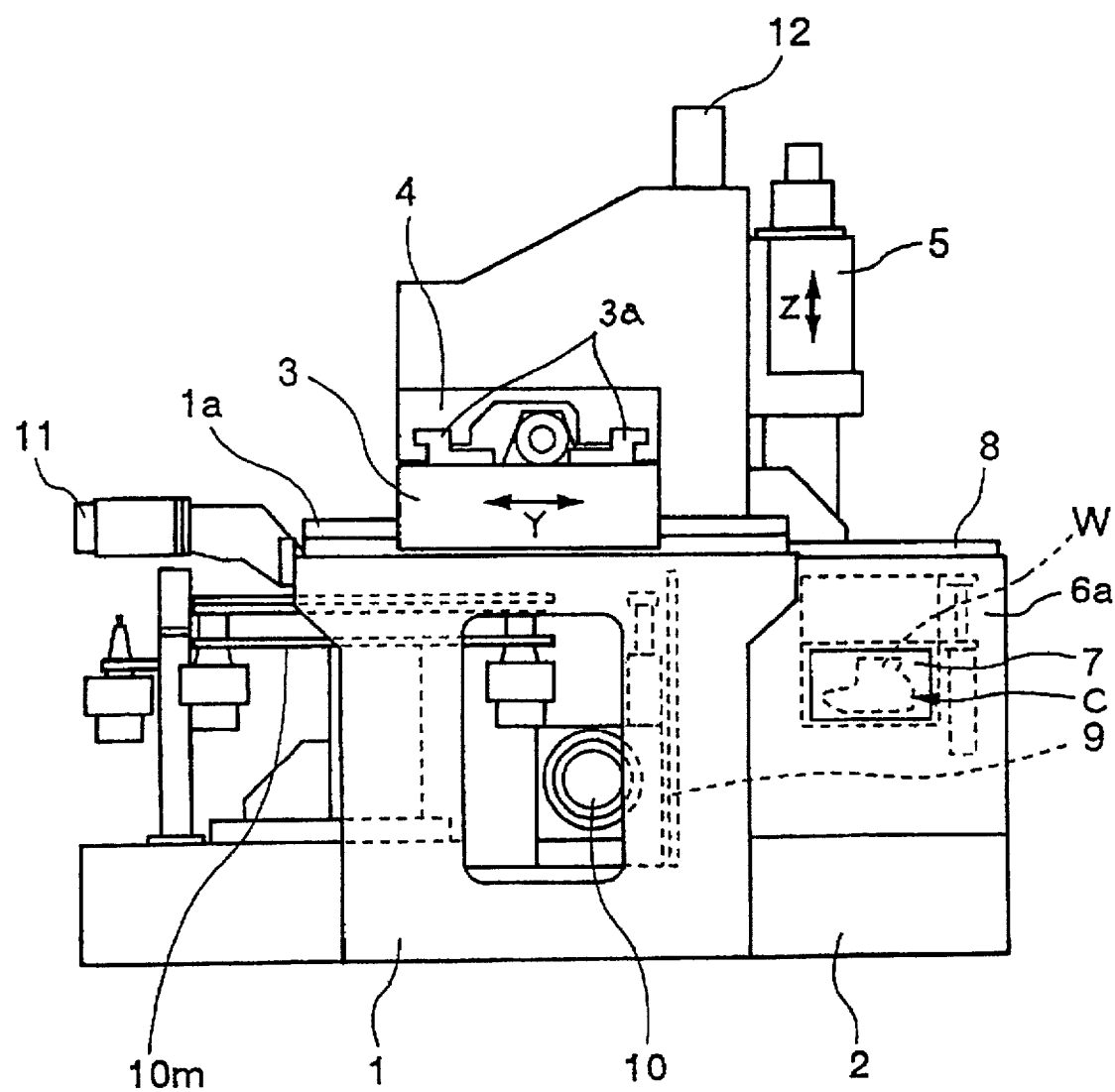
FIG. 2 is a left side view of the machine tool shown in FIG. 1.

The first embodiment will be described in detail with reference to FIGS. 1 to 13 and FIG. 16. FIGS. 1 and 2 are respectively front and left side views showing the whole of a machine tool according to the first embodiment. Numeral 1 denotes a gantry-shaped bed (spindle head base), on which a pair of guide portions 1a extending parallel in Y-direction (back and forth direction) are secured at the top of the bed 1. A first slider 3 is guided on the guide portions 1a to be movable by a motor 11 in the Y-direction. On the top of the first slider 3, a second slider 4 is guided on a pair of guide portions 3a to be movable by a motor 13 in X-direction (right and left direction) perpendicular to the Y-direction. Further, a spindle head 5 is guided on a pair of guide portions 4a of the second slider 4 to be movable by a motor 12 in Z-direction (vertical direction) perpendicular to both of the X- and Y-directions. A tool spindle 14 is rotatable by a motor (not shown) built in the spindle head 5.

Figure 5:
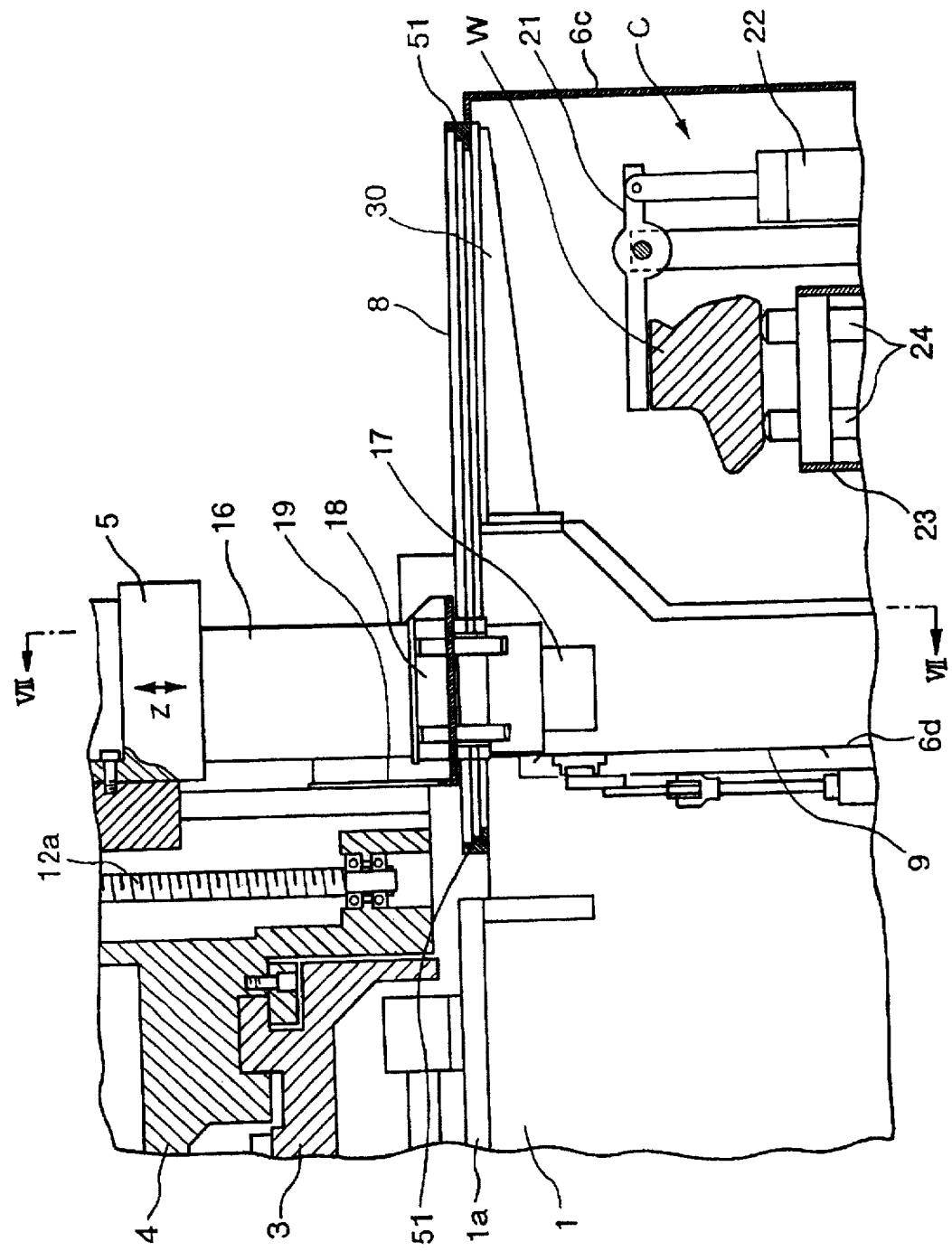
FIG. 5 is a sectional view taken taken along the line V—V in FIG. 3.

A jig device C for clamping a workpiece W is mounted on a workpiece support base 2 secured to the bed 1 at the front side thereof. The jig device C is surrounded at the four sides by a side cover assembly which comprises a pair of lateral side cover members 6a and 6b, a front side cover member 6c and a rear side cover member 6d. The top area of the jig device C is covered by a top cover assembly 8 at a lower position than the guide portions 1a, 3a and 4a on which the first slider 3, the second slider 4 and the spindle head 5 are movable respectively. At least one (preferably, both) of lateral side cover members 6a and 6b is provided with a window, which is normally closed with a shutter 7. To carry a workpiece in and out of the space (machining area) surrounded by the side cover members 6a–6d, the shutter 7 is moved in the vertical direction to open the window. As shown in FIG. 5, the workpiece W carried by a conveyer 23 into the machining area is positioned by a lifter 24 to a machining position and then, is clamped with a clamper 21 actuated by a fluid cylinder 22 of a clamp mechanism.

Turning back to FIGS. 1 and 2, a tool magazine 10m and an automatic tool changer 10 are located within column portions of the gantry-shaped bed 1, the space for which is separated by the rear side cover member 6d from the space for the jig device C. The column portions of the bed 1 extend parallel in the Y-direction and are connected at their tops through one or more cross beam portions (not shown). The rear side cover member 6d is provided with a window, which is normally closed with a tool changer shutter 9. In advance of exchanging a tool attached to the tool spindle 14 with another one, the tool changer shutter 9 is moved in the vertical direction by a cylinder-lever mechanism, described later, to open the window.

Figure 3:
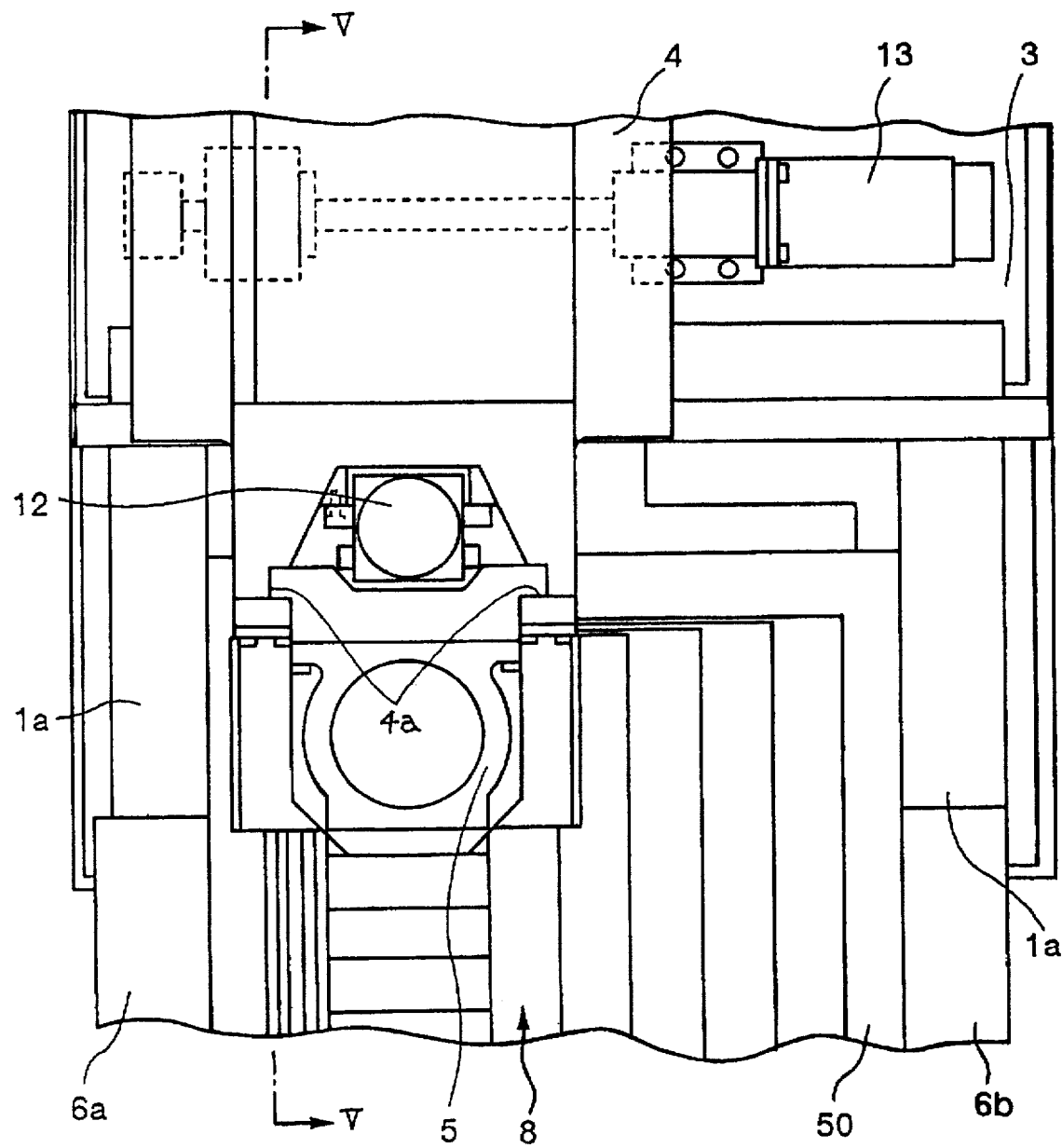
FIG. 3 is a fragmentary top plan view showing a spindle head and vicinity thereof of the machine tool.

FIG. 3 is a fragmentary top plan view showing the spindle head 5 and the vicinity thereof of the machine tool, and FIG. 4 is a fragmentary top plan view showing the top cover assembly 8 and the vicinity thereof except for the spindle head 5. The top cover assembly 8 is composed of plural first cover member 52a–e for movement in the X-direction and plural second cover members 56a–h for movement in the Y-direction. A first cover base frame 50 incorporates the first and second cover members 52a–e and 56a–h thereinto and is supported by a pair of support beams 30 which project from the column portions of the bed 1 at the front side thereof. The top cover assembly 8 has a square spindle hole 15 into which the top spindle 14 is inserted. An outer peripheral surface of the first cover base frame 50 is surrounded by the upper end portions bent inside of the lateral side cover members 6a, 6b and the front side cover member 6c.

Referring to FIG. 5, the spindle head 5 is movable in the Z-direction (i.e., vertical direction) through a feed screw 12a. A support bracket 19 is fixed by means of bolts to the front surface of a lower portion of the second slider 4. Therefore, the support bracket 19 can be moved by the first and second sliders 3 and 4 in a horizontal plane but not in the vertical direction. A lower end plate portion of the support bracket 19 has a circular hole at a central portion thereof, in which a cylindrical cover 18 is fitted. A nose portion 16 of the spindle head 5 is inserted into the square spindle hole 15 of the top cover assembly 8 through the cylindrical cover 18. The tool spindle 14 to which a cutting tool 17 is attachable is rotatably supported in the nose portion 16.

Figure 6:
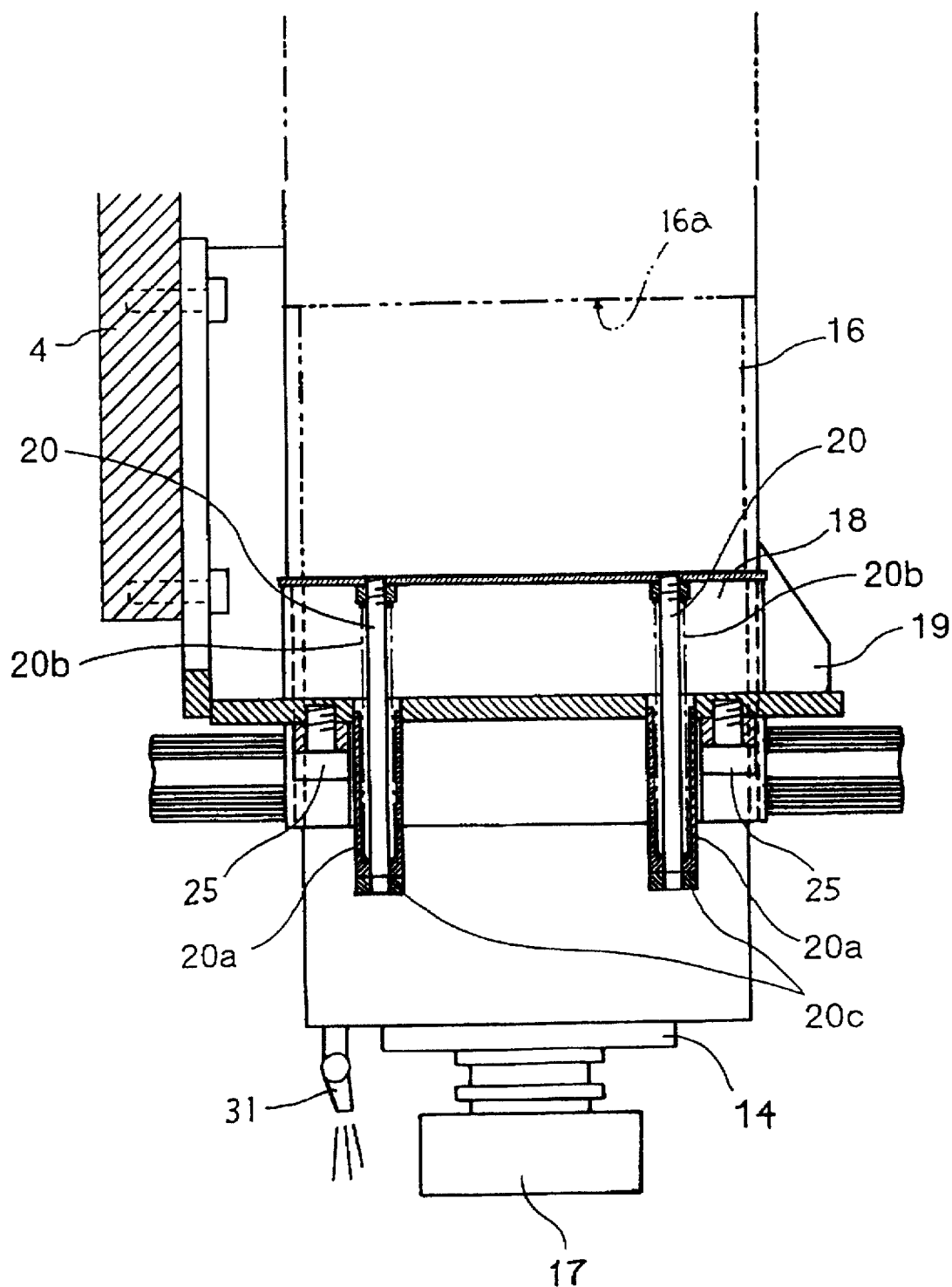
FIG. 6 is an enlarged view of an end portion of the spindle head shown in FIG. 5.

FIG. 6 is an enlarged view of the vicinity of the support bracket 19 shown in FIG. 5. Guide rods 20 extending in the vertical direction are fixed to a horizontal flange portion of the cylindrical cover 18 at four positions around the nose portion 16. Each of the guide rods 20 has a stopper 20c at the lower end thereof. The lower end plate portion of the support bracket 19 is provided with four guide sleeves 20a to respectively receive the guide rods 20. A coil spring 20b is interposed between a bottom portion of each guide sleeve 20a and the horizontal flange portion of the cylindrical cover 18, so that the cylindrical cover 18 is always urged to move upwardly.

The cylindrical cover 18 prevents coolant, cutting chips and so on from coming up from the space between the nose portion 16 and the top cover assembly 8. When the spindle head 5 is at a relatively higher position within its movable stroke, the nose portion 16 passes through the cylindrical cover 18, with a slight clearance therebetween being sealed. When the spindle head 5 is moved down to the position shown by the solid line in FIG. 6, step-up shoulder surface 16a of the nose portion 16 comes into engagement with the horizontal flange portion. Further down movement of the spindle head 5 causes cylindrical cover 18 to be pushed down against the springs 20b. The spindle head 5 can be moved down until the horizontal flange portion of the cylindrical cover 18 comes into contact with the lower end plate portion of the support bracket 19. The movable stroke of the spindle head 5 in the vertical direction can be varied by changing the lengths of the guide rods 20.

The construction of the top cover assembly 8 will now be described in detail with reference to FIGS. 9(a)–9(e). FIG. 9(e) schematically shows the entire arrangement of the first cover members 52a–e and the second cover members 56a–h jointly constructing the top cover assembly 8. Numeral 53 denotes a second cover base frame guiding the second cover members 56a–h. A pair of multi-stepped guide rails 54 extending in the Y-direction are secured to two inner end surfaces in parallel relation of the second cover base frame 53. Each of the multi-stepped guide rails 54 is made by piling up plural plate strips having different widths. The second cover members 56a–h are slidably guided by the opposite stepped portions of the multi-stepped guide rails 54 in the order of the member 56a being at the lowest position. The member 56a guided by the lowest step portions is the smallest in size as to not only its length but also its width. Regarding other members 56b–h, the widths are made wider and wider in correspondence with spans of the mating step portions therefor, and the lengths in the Y-direction are made longer and longer as the position of the corresponding step portions goes up. Also, the lengths in the Y-direction of rectangular openings of the second cover members 56a–h are made longer and longer as the position of the corresponding step portions goes up. As shown in FIGS. 9(a) and (b), flaps 59 are formed at the lower surface of each second cover member 56a–h to extend along front and rear edges thereof.

The first cover base frame 50 has a depth to house all of the first cover members 52a–e and the second cover base frame 53. The first cover base frame 50 is secured to a rectangular stationary frame 57, which is in turn secured to the pair of support beams 30 at its two bar portions extending in the Y-direction. A pair of multi-stepped guide rails 51 extending in the X-direction are secured to cross-beam portion 57a in parallel relation of the rectangular stationary frame 57, as shown in FIG. 16. Each of the multi-stepped guide rails 51 for the first cover members 52a–e is made in the same manner as the multi-stepped guide rails 54 for the second cover members 56a–h. The first cover members 52a–e and the second cover base frame 53 guiding the second cover members 56a–h are slidably guided by the opposite stepped portions of the multi-stepped guide rails 51 in the order of the second cover base frame 53 being at the lowest position. The second cover base frame 53 guided by the lowest step portions is the smallest in size as to not only its width and but also its length. Regarding the first cover members 52a–e, the lengths in the Y-direction are made longer and longer in correspondence With the spans of the mating step portions therefor, and the widths are made wider and wider as the position of the corresponding step portions goes up. Also, the widths in the x-direction of rectangular openings of the first cover members 52a–e are made wider and wider as the position of the corresponding step portions goes up. As shown in FIGS. 9.(c) and (d), flaps 58 are formed at the lower surface of each first cover member 52a–e to extend along right and left edges thereof.

Figure 8:
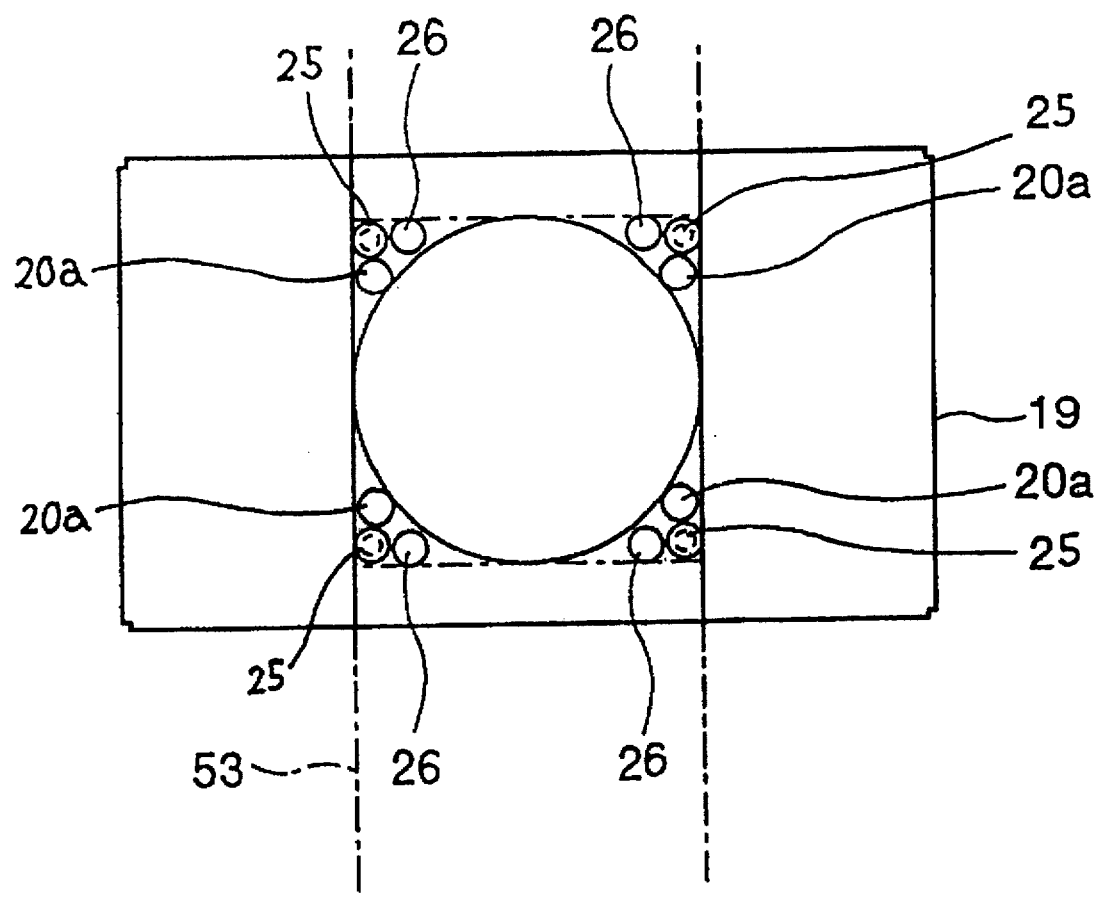
FIG. 8 is a bottom view of a support bracket shown in FIG. 7.

As shown in FIGS. 6 to 8, the lower end plate portion of the support bracket 19 rotatably carries a first set of four rollers 25 and a second set of four rollers 26. The first set of four rollers 25 are in contact with two inside surface extending in the Y-direction of the second cover base frame 53, so as to slide the first cover members 52a–e when the spindle head 5 is moved in the X-direction. The second set of four rollers 26 are in contact with two inside surfaces extending in the X-direction of the square spindle hole 15 formed on the lowest second cover member 56a, so as to slide the second cover members 56a–h when the spindle head 5 is mowed in the Y-direction. Thus, the top area of the machining position can be separated from the outside through the telescopic movements of the first cover members 52a–e and the second cover members 56a–h even when the spindle head 5 is moved in the X- and Y-directions.

The tool changer shutter 9 will be explained in detail with reference to FIGS. 10–13. FIG. 10 is an enlarged detail view of the tool changer shutter shown in FIG. 7. In back space of the rear side cover member 6d, the cylinder-lever mechanism including a lever 61 and a hydraulic cylinder 60 is arranged beside the automatic tool changer 10 having an arm 10a. In order that the tool changer shutter 9 can be moved without chattering, a pair of guide bars 67 are fixedly provided at opposite sides of the tool changer shatter 9.

As best shown in FIG. 11, the rear side cover member 6d has a cross-section resembling a hat. A main partition portion of the rear side cover member 6d is arranged at a position receding somewhat from the front ends of the column portions of gantry-shaped bed 1. The rear side cover member 6d is secured to a pair of support brackets 59a and 59b which are in turn secured to the bed 1. The hydraulic cylinder 60 is pivotably carried at its lower end to the support bracket 59a. The lever 61 is carried at its base end to the support bracket 59a to be rotatable about a hinge pin 61a. An outer end of a piston rod of the hydraulic cylinder 60 is pivotably connected to the middle portion of the lever 61.

The support brackets 59a and 59b are formed with a pair of guides 58 to guide the tool changer shutter 9 in the Z-direction, wherein a plurality (six in this particularly embodiment) of rollers 64 are rotatably carried on the tool changer shutter 9 at opposite end portions thereof, three rollers being at one end portion along one of the guides 58 while the remaining three rollers being at the other end portion along the other guide 58. A cam 63 grooved in the X-direction is secured to the upper portion of the tool changer shutter 9, and a roller 62 carried at the front end of the lever 61 is engaged with the cam 63. At the opposite ends of the arm 10a, semi-circular grippers 10b are formed to hold a tool attached to the tool spindle 14 and the tool stored in the tool magazine 10m. The arm 10a is normally held in parallel to the tool changer shutter 9, as shown by the solid line in FIG. 11. After the tool changer shutter 9 is lowered to open for tool change operation, the arm 10a is pivoted through 90 degrees to the change position shown by the two-dot chain line in FIG. 11.

FIG. 13 shows a spring mechanism for preventing chattering of the tool changer shutter 9. Each of the guide bars 67 is secured by upper and lower support members 66 and 69 to a corresponding one of the support brackets 59a and 59b. Secured to the upper end of the tool changer shutter 9 are L-letter shaped thrust members 65 through which the guide bars 67 pass. Between the thrust members 65 and the lower support members 69, coil springs 68 are respectively interposed so that the tool changer shutter 9 is always urged to move upwardly. This causes the grooved cam 63 to be urged upwardly against the roller 62 of the lever 61. Therefore, chattering of the tool changer shutter 9 can be prevented not only while the tool changer shutter 9 is moved up and down but also while it remains either at its lowered position or its elevated position.

The operations of the first embodiment will be described hereinafter. The shutter 7 on the lateral side cover member 6a or those shutters on the opposite lateral side cover members 6a and 6b are opened to carry a new workpiece into the machining area. In the case where the machine tool is arranged on the transfer line, the conveyer or transfer carrier 23 which is dedicated to each machine tool unloads a workpiece from another machine tool (not shown) at the upper stream and then, loads it onto the jig device C of such each machine tool. Thus, all workpieces charged into the transfer line are simultaneously moved by the conveyers or the transfer carriers 23 which are respectively dedicated to all the machine tools of the transfer line. The workpiece finished by each machine tool is unloaded from the jig device C through the window of the lateral side cover member 6b and a new one is loaded thereonto through the window of the lateral side cover member 6a. The lifter 24 lifts the workpiece W carried on the jig device C and then, the clamper 21 is actuated by the fluid cylinder 22 to clamp the workpiece W.

During the transfer operation of the workpiece W, the tool spindle 14 is positioned at a tool change position where the used tool 17 is exchanged by the automatic tool changer 10 with a new one necessary for the next machining operation. In tool changing operation, the hydraulic cylinder 60 is actuated to pivot the lever 61 downwardly about the hinge pin 61a. The pivotal motion of the lever 61 causes the roller 62 carried at the free end thereof to be moved along the grooved cam 63, whereby the tool changer shutter 9 is moved downwardly to open the window.

Subsequently, the arm 10a of the automatic tool changer 10 is rotated through 90 degrees from the parked position shown by the solid line in FIG. 11 to the change position shown by the two-dot chain line in FIG. 11. The semicircular grippers 10b at the opposite ends of the arm 10a grip the tool on the tool spindle 14 and the tool of the tool magazine 10m simultaneously. The arm 10a is moved down to extract the tools from the tool spindle 14 and the tool magazine 10m. The arm 10a is then rotated through 180 degrees and is moved up to insert the tools respectively to the tool spindle 14 and the tool magazine 10m. Thereafter, the arm 10a is rotated in an opposite direction through 90 degrees to return to the parked position shown by the solid line. After such tool charging operation, the hydraulic cylinder 60 is quickly actuated to close the tool changer shutter 9. At the same time, the shutters 7 on the lateral side covers 6a and 6b are closed upon completion of the unloading and loading operation of the workpieces. After that, the tool spindle 14 having received the new tool 17 is moved to the machining position through the movements of the first slider 3, the second slider 4 and the spindle head 5, whereby the machining operation on the workpiece W is initiated with the new tool 17 then rotated.

During the movements of the nose portion 16 in the X-and Y-directions, the support bracket 19 fixed to the front surface. Of the second slider 4 is moved together with the nose portion 16. When the support bracket 19 is moved in the X-direction, the second cover base frame 53 is caused to follow the movement of the support bracket 19 since, as shown in FIG. 8, the rollers 25 carried on the support bracket 19 are in contact with two inside surfaces extending in the Y-direction of the second cover base frame 53. As schematically illustrated in FIG. 9(e), the second cover base frame 53 is supported under the lowest one (the member 52a) of the first cover members 52a–e, and the lowest first cover member 52a right over the second cover base frame 53 is wider than the second cover base frame 53. When the second cover base frame 53 is moved right, for example, it comes into engagement with the right flap 58 of the lowest first cover member 52a in the course of movement, so that the lowest first cover member 52a is moved toward the right with a delay after movement of the second cover base frame 53. Further right movement of the second cover base frame 53 brings the lowest first cower member 52a into engagement with the right flap 58 of the second lowest first cover member 52b. In this manner, each lower first cover member comes into abutting engagement with the right flap 58 of an immediately upper first cover member, whereby the first cover members 52a–e are caused to be moved one after another toward the right. When the second cover base frame 53 is moved toward the left, the first cover members 52a–e are caused to be moved one after another toward the left in the same manner as described above.

When the support bracket 19 is moved in the Y-direction, the lowest second cover member 56a is caused to follow the movement of the support bracket 19 within the second cover base frame 53 since the rollers 26 carried on the support bracket 19 are in contact with two inside surfaces extending in the X-direction of the square spindle hole 15 of the lowest second cover member 56a. The second lowest second cover member 56b right over the first lowest second cover member 56a is longer in the Y-direction than the member 56a. When the support bracket 19 is moved forward, for example, the first lowest second cover member 56a is first moved and then comes into engagement with the front flap 59 of the second lowest second cower member 56b in the course of movement, so that the second lowest second cover member 56b is moved forward with a delay after the movement of the first lowest second cover member 56a. Further forward movement of the support bracket 19 brings the second lowest second cover member 56b into engagement with the third lowest second cover member 56c to move the same in this manner, each lower second cover member comes into abutting engagement with the front flaps 58 of an immediately upper second cover member, whereby the second cover members 56a–h are caused to be moved one after another forward. When the support bracket 19 is moved backward, the second cover members 56a–h are caused to be moved one after another backward in the same manner as described above.

In FIG. 6, numeral 31 indicates a coolant nozzle for supplying coolant during machining operation. It is to be noted that the cylindrical cover 18 is relatively long, so that coolant, cutting chips and so on are prevented from coming up from the clearance between the internal surface of the cylindrical cover 18 and the nose portion 16.

Referring now to FIG. 14, there is illustrated a top cover assembly 8' used in the second embodiment. A flexible bellow 90 made of rubber is secured at its circumferential portion to a first cover base frame 50', and at its internal portion to a support bracket 19'. The bellow 90 is formed with a plurality of pleat portions 90a which are foldable in any radial direction. Thus, even when the support bracket 19 is moved together with the spindle head 5 within a horizontal plane, the bellow 90 works to reliably cover the top area over the machining position. An additional shutter may be provided on the front side cover member 6c for the loading and unloading of a workpiece from the front side of the machine tool. The provision of the additional shutter on the front side cover member 6c is particularly advantageous where the machine tool is used as "stand-alone" (i.e., without being arranged on the transfer line).

Obviously, numerous modifications and variations of the present invention are possible in light of the above teachings. It is therefore to be understood that within the scope of the appended claims, the present invention may be practiced otherwise than as specifically described herein.

What is claimed is:

1. A machine tool comprising:
    a spindle head base;
    a spindle head rotatably supporting a vertical tool spindle;
    a guide mechanism provided on said spindle head base and guiding said spindle head in mutually orthogonal first and second horizontal directions and in a vertical direction;
    a workpiece support base provided at a front side of said spindle head base for supporting a workpiece;
    a side cover assembly including a rear side cover member, a front side cover member and a pair of lateral side cover members, and surrounding said workpiece on said workpiece support base so as to define a machining area therewithin; and a top cover assembly cooperating with said side cover assembly to cover an upper end of said side cover assembly and having a spindle hole through which a nose portion of said spindle head passes so as to permit said tool spindle to reach said machining area, said top cover assembly being flexibly operable to follow the movements of said spindle head in said first and second horizontal directions;

wherein said side cover assembly further comprises:

a first shutter provided for closing a window which is formed at one of said lateral side cover members for loading said workpiece into said machining area therethrough; and a second shutter provided for closing a window which is formed at the other of said lateral side cover members for unloading said workpiece from said machining area therethrough.

2. A machine tool as set forth in claim 1, wherein said top cover assembly is provided at a lower position than said guide mechanism.

3. A machine tool as set forth in claim 1, wherein:

said rear side cover member is provided adjacent to said spindle head base;

said front side cover member is provided in parallel with said rear side cover member but remote from said spindle head base; and a pair of said lateral side cover members are provided one at one side of said front and rear side cover members and the other at the other side thereof for defining said machining area of a substantially rectangular shape together with said front and said rear side cover members.

4. A machine tool comprising:

a gantry-shaped base having a pair of parallel column portions;

a first slider guided along a pair of first guide portions which are formed on a top of said column portions;

a second slider guided along a pair of second guide portions which are formed on a top of said first slider to extend in a direction perpendicular to said first guide portions;

a pair of third guide portions which are formed at a front surface of said second slider to extend in a vertical direction perpendicular to both of said first and second guide portions;

a spindle head guided along said third guide portions in said vertical direction and rotatably carrying a tool spindle;

a workpiece support base located at a front side of said gantry-shaped base;

a jig device mounted on said workpiece support base;

right and left side covers located parallel to said first guide portions so as to surround right and left sides of said jig device;

front and rear side covers located parallel to said second guide portions so as to surround front and rear sides of said jig device;

a top cover assembly for covering a top portion of a machining area defined by said right, left, front and rear side covers; and a hole formed on said top cover assembly for permitting a nose portion of said spindle head to enter said machining area, said hole following movements of said spindle head in a horizontal plane;

wherein:

a first shutter is provided for closing a window which is formed at one of said right and left side covers for loading said workpiece into said machining area therethrough; and a second shutter is provided for closing a window which is formed at the other of said right and left side covers for unloading the workpiece from said machining area therethrough.

5. A machine tool as see forth in claim 4, wherein:

said top cover assembly is provided at a lower position than said first guide portions, said second guide portions and third guide portions.

6. A machine tool as set forth in claim 3, wherein:

said spindle head base is provided with a pair of parallel column portions extending in parallel relation with said lateral side cover members, said parallel column portions defining under said guide mechanism a space which is separated by said rear side cover member from said machining area; and wherein said machine tool further comprises a tool magazine and an automatic tool changer provided in said space defined by said parallel column portions.

7. A machine tool as set forth in claim 6, wherein:

said side cover assembly further comprises a third shutter for selectively opening and closing a window which is formed at said rear side cover member; and wherein said automatic tool changer is operable to present at least a part thereof into said machining area for changing tools between said tool spindle and said tool magazine.

8. A machine tool as set forth in claim 1, wherein said guide mechanism comprises:

a first slider movable on the top of said spindle head base along a first guide way extending in said first horizontal direction;

a second slider movable on said first slider along a second guide way extending in said second horizontal direction; and a third guide member formed at a front surface of said second slider to guide said spindle head in the vertical direction.

9. A machine tool as set forth in claim 8, wherein said top cover assembly comprises:

a plurality of first cover members telescopically movable in said second horizontal direction;

a plurality of second cover members supported on one of said first cover members and telescopically movable in said first horizontal direction, at least one of said second cover members having said spindle hole for permitting said nose portion of said spindle head to pass therethrough; and a motion transfer mechanism for enabling said first cover members to follow the movement of said second slider and said second cover members to follow the movement of said first slider.

10. A machine tool as set forth in claim 9, wherein:

widths in the second direction of said first cover members are made wider and wider as the position goes up, while lengths in the first direction of said second cover members are made longer and longer as the position goes up.

11. A machine tool as set forth in claim 5, wherein:

said machine tool further comprises a tool magazine and an automatic tool changer under said base in a space which is separated by said rear side cover from said machining area.

* * * * *